United States Patent [19]
Geka

[11] Patent Number: 5,213,419
[45] Date of Patent: May 25, 1993

[54] LINEAR MOTION ROLLING CONTACT GUIDE UNIT HAVING COMPLEMENTARY END PLATES

[75] Inventor: Toshiaki Geka, Kagamigahara, Japan

[73] Assignee: Nippon Thompson Co., Ltd., Japan

[21] Appl. No.: 853,225

[22] Filed: Mar. 17, 1992

[30] Foreign Application Priority Data

Mar. 18, 1991 [JP] Japan .................................. 3-78544

[51] Int. Cl.⁵ .............................................. F16L 29/04
[52] U.S. Cl. .................................................... 384/49
[58] Field of Search ................ 384/47, 49, 50, 51, 384/15

[56] References Cited

U.S. PATENT DOCUMENTS

4,629,260 12/1986 Kasai ..................................... 384/49
4,655,613 4/1987 Yokota ................................... 384/49

FOREIGN PATENT DOCUMENTS

60718 5/1980 Japan ..................................... 384/49

*Primary Examiner*—Thomas R. Hannon
*Attorney, Agent, or Firm*—Skjerven, Morrill, MacPherson, Franklin & Friel

[57] ABSTRACT

A linear motion guide unit of the finite type includes a rail, a slider, a plurality of rolling members interposed between the rail and the slider, and a retainer for retaining the rolling members in position. The slider is provided with a slider end plate at each end, which includes a first projection extending substantially across the gap between the rail and the slider. The rail is also provided with a rail end plate at each end, and the rail end plate is also provided with a second projection extending substantially across the rail to slider gap at a location so as not to come into engagement with the first projection. Thus, these first and second projections can serve as effective stopper for the retainer.

8 Claims, 10 Drawing Sheets

LINEAR MOTION ROLLING CONTACT GUIDE UNIT HAVING COMPLEMENTARY END PLATES

BACKGROUND OF THE INVENTION

1. Field of the Invention

This invention generally relates to a linear motion rolling contact guide unit, and, in particular, to a finite linear motion rolling contact guide unit including a retainer for retaining a plurality of rolling members interposed between a rail and a slider.

2. Description of the Prior Art

A linear motion rolling contact guide unit is well known in the art and it generally includes a rail or base, a slider slidably mounted on the rail and a plurality of rolling members interposed between the rail and the slider. There are basically two types of such guide units. That is, one type of such guide units is of the endless linear motion type in which the slider may move along the rail as long as the rail exits; whereas, the other type is of the finite linear motion type in which the slider may move relative to and along the rail over a limited distance. In the case of the finite linear motion type, use is typically made of a retainer for retaining the rolling members in position between the rail and the slider.

One typical prior art finite linear motion guide unit is schematically shown in perspective view in FIG. 18. As shown, the illustrated finite linear motion guide unit includes a rail 22, which is elongated in shape and extends over a desired distance, and a slider or table 21 which is substantially equal in length in the longitudinal direction to the rail 22. The rail 22 is generally rectangular in shape in the illustrated structure and provided with a pair of left and right inner guide grooves 28 on its opposite side surfaces. The slider 21 is generally U-shaped in cross section and slidably mounted on the rail 22 in a straddling manner. The slider 21 is provided with a pair of left and right outer guide grooves 27 each located spaced apart from and facing opposite to a corresponding one of the pair of inner guide grooves 28. Thus, a guide channel is defined between each associated pair of inner and outer guide grooves 28 and 27, and a plurality of rolling members or rollers 23 in the illustrated example are provided in the guide channel. As a result, the rollers 23 are partly received in both of the associated inner and outer guide grooves 28 and 27 so that a rolling contact is provided between the rail 22 and the slider 21. In the illustrated example, the rollers 23 are arranged in the so-called crossed arrangement in which any two adjacent rollers 23 are arranged with their rotating axes directed perpendicular to each other when viewed into the direction of advancement.

As shown in FIG. 18, also provided is a retainer 24 in the form of an elongated plate for retaining the rollers 23 in position in the guide channel. In this structure, because of the provision of the retainer plate 24, the rollers 23 can be maintained at desired positions even if a relative motion is produced between the rail 22 and the slider 21 so that a uniform distribution of load may be maintained. However, in this structure, especially when a linear reciprocating motion is repeatedly produced, there is a chance that the retainer 24 deviates from its intended position. In particular, as shown in FIG. 19, the end surface of the retainer plate 24 may come into abutment against the tip end portion 30 of an end stopper plate 26 mounted on the rail 22 or against the tip end portion of an end screw 25 threaded into the table 21.

In such a case, since the area of abutment or contact between the end surface of the retainer plate 24 and the tip end portion 30 or 31 of either of the end stopper plate 26 or the end screw 25, when the end surface of retainer plate 24 has come into abutment against the end stopper plate 26, the retainer plate 24 tends to be deflected toward the slider 21 or to the right in FIG. 19, on the other hand, when the end surface of retainer plate 24 has come into abutment against the end screw 25, then the retainer plate 24 tends to be deflected toward the rail 22 or to the left in FIG. 19. As a result, there is a chance that the end portion of retainer plate 24 slips through the gap between the end stopper plate 26 and the end screw 25 and thus is projected out of the linear motion guide unit in an excessive instance.

SUMMARY OF THE INVENTION

In accordance with the present invention, there is provided an improved linear motion guide unit including a rail, a slider slidably mounted on the rail, a plurality of rolling members interposed between the rail and the slider, a retainer for retaining the rolling members in position, and at least one pair of end plates having complementarily profiled shapes fixedly attached to end surfaces of said rail and slider. In the preferred embodiment, one of the pair of end plates has at least one transversely projected portion serving as a stopper against the retainer so that the retainer is effectively prevented from slipping away through a gap between the associated end plates and the other of the pair of end plates has at least one transversely recessed portion which is substantially complementary in shape with the projected portion.

In accordance with the present invention, since the associated pair of end plates has profiled shapes complementary to each other, one of the end plates has a projected portion which can serve as a stopper which securely engages with one end of the retainer to thereby prevent the retainer from slipping away. Besides, since the associated remaining end plate is partly recessed to be complementary in shape with the end plate having the projected portion, these associated end plates do not come into engagement with each other when the slider slides along the rail, so that a desired relative motion between the rail and the slider is not impaired at all.

It is therefore a primary object of the present invention to provide an improved linear motion rolling contact guide unit reliable and smooth in operation.

Another object of the present invention is to provide an improved finite linear motion rolling contact guide unit capable of securely preventing its retainer plate from being deformed or slipping away.

A still further object of the present invention is to provide an improved finite linear motion rolling contact guide unit having an increased durability.

A still further object of the present invention is to provide an improved finite linear motion rolling contact guide unit compact in size and yet high in rigidity.

Other objects, advantages and novel features of the present invention will become apparent from the following detailed description of the invention when considered in conjunction with the accompanying drawings.

DESCRIPTION OF THE PREFERRED EMBODIMENTS

Figure 1:
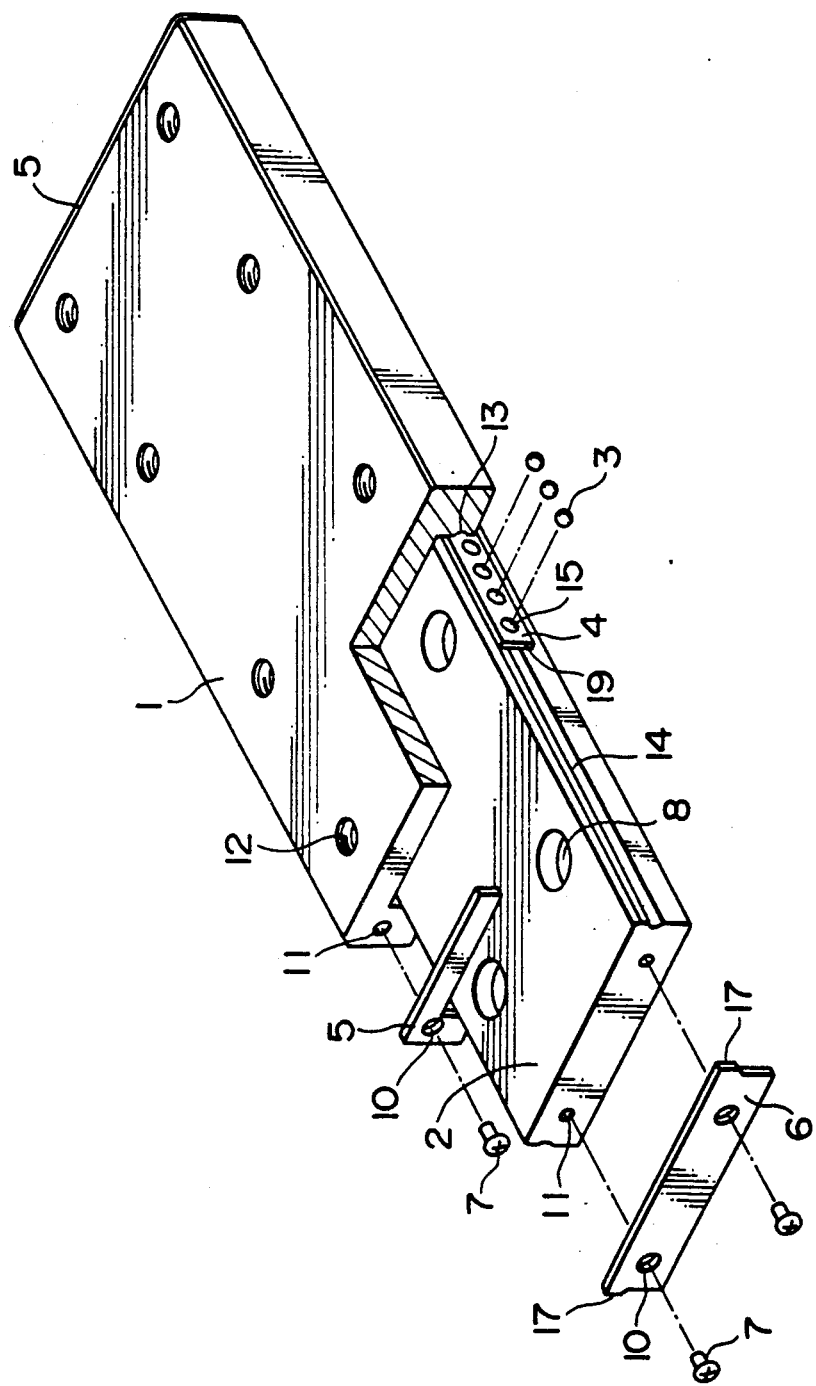
FIG. 1 is a schematic illustration showing in perspective view, partly cut-away and partly removed, a linear motion rolling contact guide unit constructed in accordance with one embodiment of the present invention.

Referring now to FIGS. 1 through 12, a linear motion rolling contact guide unit of the finite type constructed in accordance with one embodiment of the present invention will be described. As shown in FIGS. 1 through 4, 11 and 12, the present linear motion rolling contact guide unit generally includes a bed or rail 2 which is elongated in shape and extends over a desired length, a table or slider 1 which is slidably mounted on the rail 2 in a straddling manner, a plurality of rolling members 3 interposed between the rail 2 and the slider 1 to provide a rolling contact therebetween and a retainer plate 4 also interposed between the rail 2 and the slider 1 for retaining the rolling members 3 in position. In the illustrated embodiment, use is made of balls for the rolling members 3; however, it is to be noted that the present invention should not be limited to such a specific application, and use may be made of any other types of rolling members, such as rollers in an aligned arrangement or crossed arrangement.

In the illustrated embodiment, the rail 2 is generally rectangular in cross section and it is provided with an inner guide groove 14 on each side surface thereof. The inner guide groove 14 extends in parallel with the longitudinal axis of the rail 2. On the other hand, the slider 1 has a generally U-shaped cross section and thus includes a horizontal section and a pair of vertical sections projecting downward from the opposite sides of the horizontal section. The slider 1 is also provided with an outer guide groove 13 at an inner side surface of each of the vertical sections located opposite to a corresponding one of the inner guide grooves 14 when assembled. Thus, when assembled, a guide channel is defined by a pair of associated inner and outer guide grooves 14 and 13 between the rail 2 and the slider 1.

A plurality of rolling members 3, or balls in the illustrated embodiment, are provided in each of the guide channels so that the balls 3 are partly received in each of the associated inner and outer guide grooves 14 and 13 to thereby provide a rolling contact between the rail 2 and the slider 1. Also provided in each of the guide channels is a retainer plate 4 which is elongated in shaped and which serves to retain the balls 3 in position at all times. As shown in FIG. 1, the retainer plate 4 is provided with a plurality of openings or windows 15 each of which retains therein an associated one of the balls 3. The retainer plate 4 is preferably provided so as not to strongly engage with either of the rail 2 and the slider 1 since such a strong engagement would be a significant source of sliding resistance.

Also as best shown in FIG. 1, the slider table 1 is provided with a plurality of mounting holes 12 which are threaded and thus which may be used for attaching a desired object, such as a moving component of a machine, to the slider 1 fixedly by means of bolts or the like. The rail 2 is also provided with a plurality of mounting holes 8 which may also be threaded and which can be used for attaching the rail 2 to any desired object, such as a frame of the machine.

The present linear motion guide unit is also provided with a slider end plate 5 which is fixedly attached to each end surface thereof by means of screws 7 which in turn pass through respective holes 10 of the slider end plate and are threaded into threaded holes 11 provided at the end surface of the slider 1. Similarly, the rail 2 is also provided with a rail end plate 6 which is fixedly attached to each end surface thereof by means of screws 7 which in turn pass through respective holes 10 of the rail end plate 6 and are threaded into threaded holes 11 provided at the end surface of the rail 2. Of importance, each of the end plates 5 and 6 has a particular shape defined according to the principle of the present invention.

Figure 9:
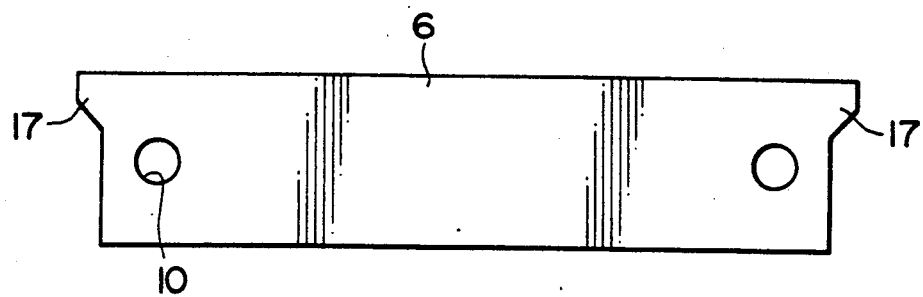
FIG. 9 is a schematic illustration showing in front view a rail end plate having a transversely projected portion constructed in accordance with one embodiment of the present invention and employed in the guide unit of FIG. 1.

That is, in the specific embodiment shown in FIGS. 1 through 12, as shown in FIG. 9, the rail end plate 6 is generally rectangular in shape, but it is provided with an outwardly extending projection 17 approximately at the upper half of each side edge. As a result, the rail end plate 6 is generally in the shape of "T." The outward side projection 17 is so sized that it extends across the gap between the side surfaces of the rail 2 and the slider 1 as much as possible, but it does not extend excessively to interfere with the slider 1. Thus, the outward side projection 17 may serve as an effective stopper against the retainer plate 4 since the retainer plate 4 may be arrested securely with its end surface 19 coming into contact with the outward side projection 17. In the structure shown in FIG. 9, the outward side projection 17 has a slanted side so as to avoid the creation of any stress concentration since the retainer plate 4 can impinge upon the outward side projection 17 under some applications.

Figure 10:
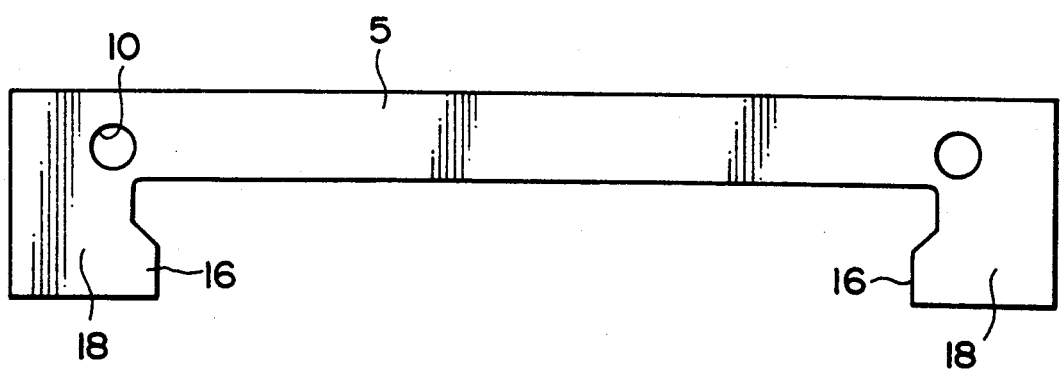
FIG. 10 is a schematic illustration showing in front view a slider end plate having a recessed portion complementary in shape with the associated end plate of FIG. 9 constructed in accordance with one embodiment of the present invention and employed in the guide unit of FIG. 1.
Figure 12:
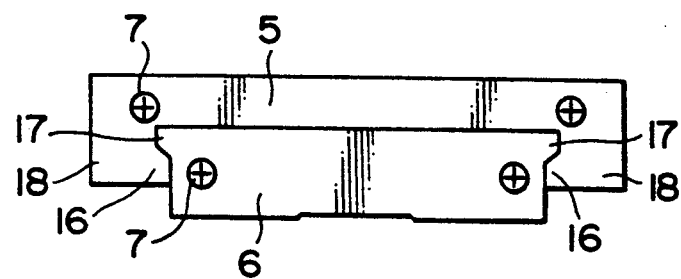
FIG. 12 is a schematic illustration showing in front view the guide unit of FIG. 1 in the overlapping state shown in FIG. 11.

On the other hand, FIG. 10 illustrates the slider end plate 5 which includes a horizontal section and a pair of vertical sections 18 extending downward from the opposite ends of the horizontal section generally in conformance with the cross sectional shape of the slider 1. However, of importance, the slider end plate 5 is also provided with an inwardly extending projection 16 which extends inwardly from the inner side of each of the vertical sections approximately at its bottom half. As a result, the slider end plate 5 may be said to be generally in the shape of "C." It is to be noted that the distance between the vertical side sections 18 of the slider end plate 5 is selected to allow the associated rail end plate 6 to be fitted therein with a predetermined clearance therebetween. Thus, the rail end plate 6 may be fitted into the space defined by the slider end plate 5 similar to the jigsaw puzzle and yet without contact therebetween. The inward projection 16 is so sized to extend substantially across the gap between the side surfaces of the rail 2 and the slider 1 so as to allow to securely arrest the retainer plate 4, thereby serving as an effective stopper. However, the inward projection 16 should not extend excessively to engage with the rail 2 itself. The inward projection 16 also has a slant side edge and this structure is advantageous since it can avoid the creation of stress concentration as much as possible. Preferably, as best shown in FIGS. 9, 10 and 12, the outward and inward projections 17 and 16 are complementary in shape at least partly. In the illustrated embodiment, since the outward and inward projections 17 and 16 are complementary in shape with a predetermined clearance therebetween, each of the projections 17 and 16 can provide the largest possible contact or stopper surface against the end surface 19 of the retainer plate 4. Besides, these complementary projections 17 and 16 also can serve as a shield cover when they are aligned for example at the home position.

Figure 2:
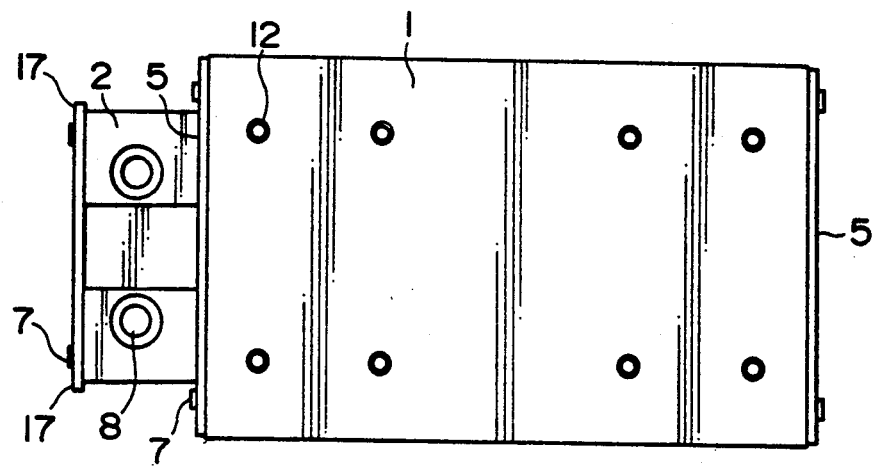
FIG. 2 is a schematic illustration showing in plan view the guide unit of FIG. 1.
Figure 3:
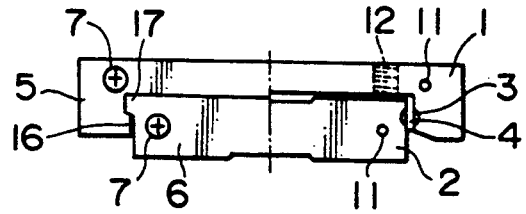
FIG. 3 is a schematic illustration showing in front view with the right half of each of its associated end plates removed the guide unit of FIG. 1.
Figure 4:
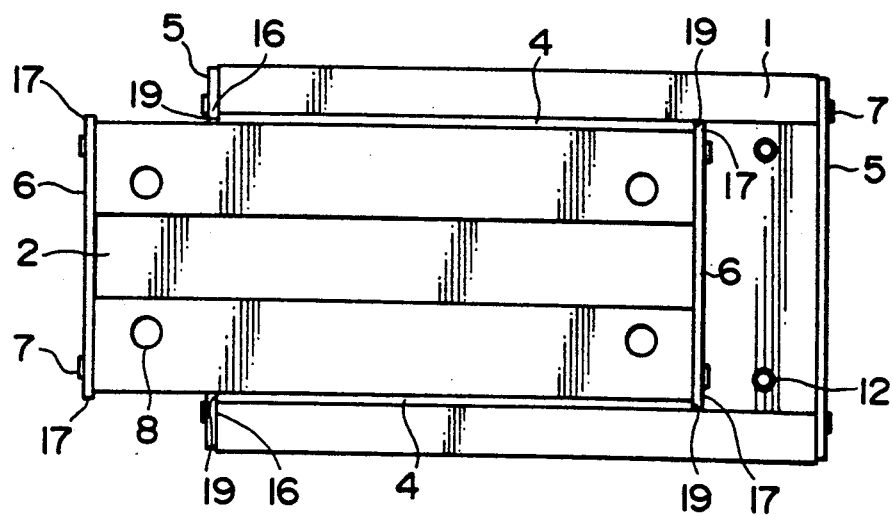
FIG. 4 is a schematic illustration showing in bottom view the guide unit of FIG. 1.
Figure 5:
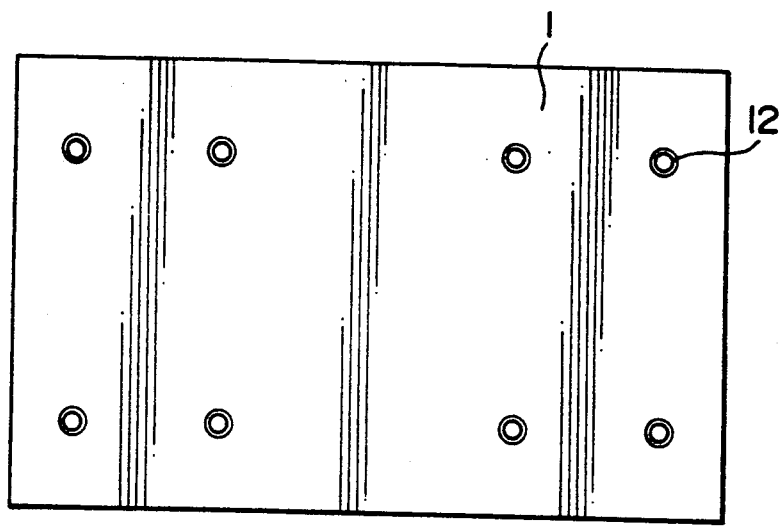
FIG. 5 is a schematic illustrating showing in plan view the slider or table employed in the guide unit of FIG. 1.
Figure 6:
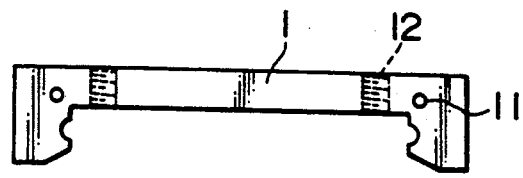
FIG. 6 is a schematic illustration showing in front view the slider shown in FIG. 5.
Figure 7:
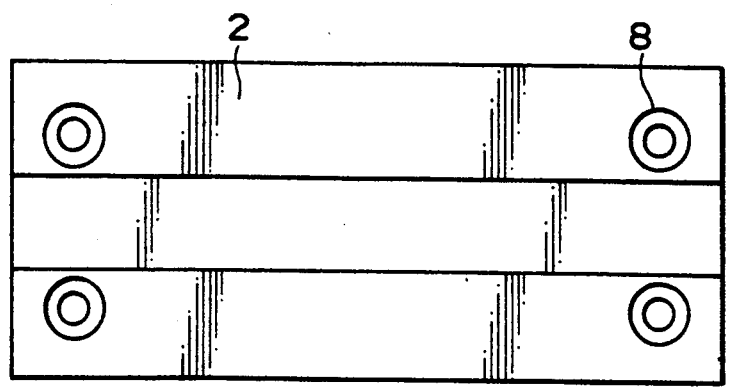
FIG. 7 is a schematic illustration showing in plan view the rail or bed employed in the guide unit of FIG. 1.
Figure 8:
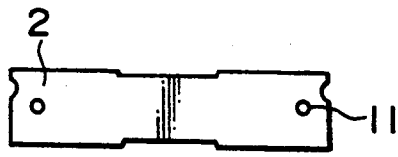
FIG. 8 is a schematic illustration showing in front view the rail shown in FIG. 7.

In the embodiment shown in FIGS. 1 through 12, the rail 2 and the slider 1 are substantially equal in length in the longitudinal direction. FIGS. 2 and 4 illustrate one limit condition in which the slider 1 has moved to the rightmost position relative to the rail 2. Under the condition, the left-hand end surface 19 of the retainer plate 4 is arrested by or in abutment against the left-hand slider end plate 5 and the right-hand end surface 19 of the retainer plate 4 is arrested by or in abutment against the right-hand rail end plate 6. Thus, the slider 1 is halted at its rightmost location relative to the rail 2.

Figure 11:
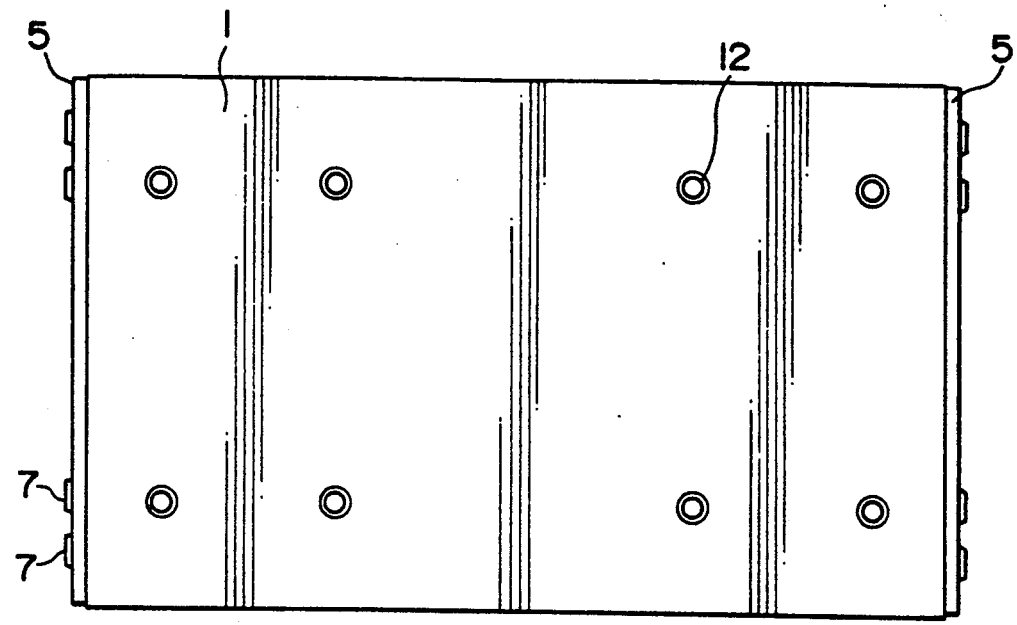
FIG. 11 is a schematic illustration showing an overlapping state between the rail and the slider in the guide unit of FIG. 1.

On the other hand, FIG. 11 illustrates the condition when the slider 1 is located at its home position so that the slider end plate 5 is aligned with the rail end plate 6 at each end. In the illustrated embodiment, since the slider and rail end plates 5 and 6 are substantially complementary in shape along their mating edges, the gap between the slider 1 and the rail 2 may be closed substantially, thereby preventing any undesired foreign matter coming into the gap between the slider 1 and the rail 2. It is to be noted, however, that a predetermined clearance is set between the opposite edges of the associated slider and rail end plates 5 and 6 so that these end plates 5 and 6 are prevented from coming into engagement during operation.

Figure 13:
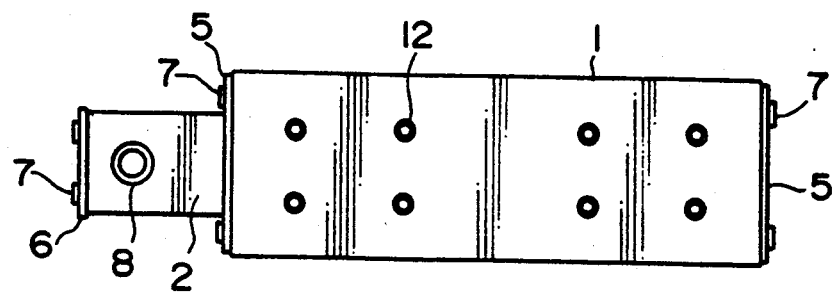
FIG. 13 is a schematic illustration showing in plan view a linear motion guide unit constructed in accordance with another embodiment of the present invention.
Figure 14:
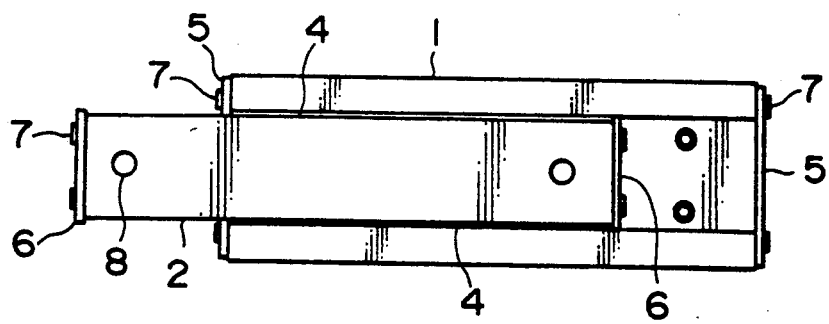
FIG. 14 is a schematic illustration showing in bottom view the guide unit shown in FIG. 13.
Figure 15:
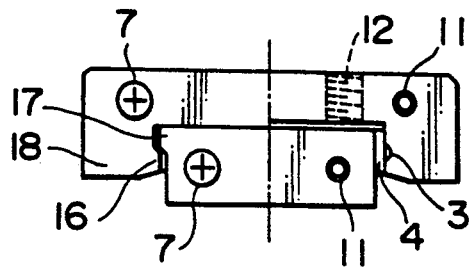
FIG. 15 is a schematic illustration showing in front view on a somewhat enlarged scale the guide unit of FIG. 13 with its right-hand half removed.

FIGS. 13 through 15 show a linear motion rolling contact guide unit of the finite type constructed in accordance with another embodiment of the present invention, which is smaller in size as compared with the previously described embodiment. Other than the size, the present embodiment is substantially same in structure and function as the previously described embodiment. FIGS. 13 and 14 shows a stroke limit condition in which the slider 1 is located at its rightmost location relative to the rail 2 with its retainer plate 4 in abutment against the left-hand end plate 5 of the slider 1 and also against the right-hand end plate 6 of the rail 2.

Figure 16:
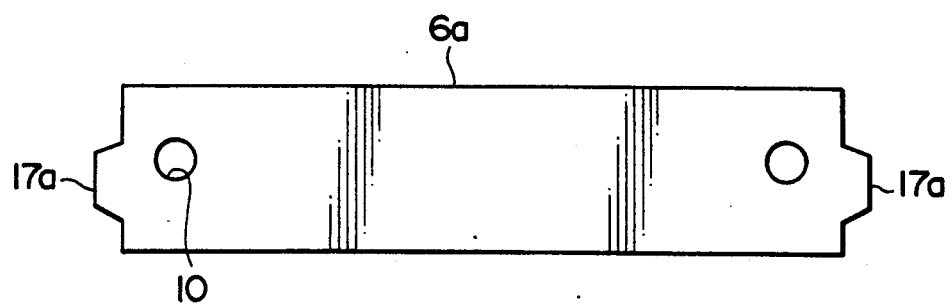
FIG. 16 is a schematic illustration showing in front view a rail end plate having a transversely projected portion constructed in accordance with another embodiment of the present invention.
Figure 17:
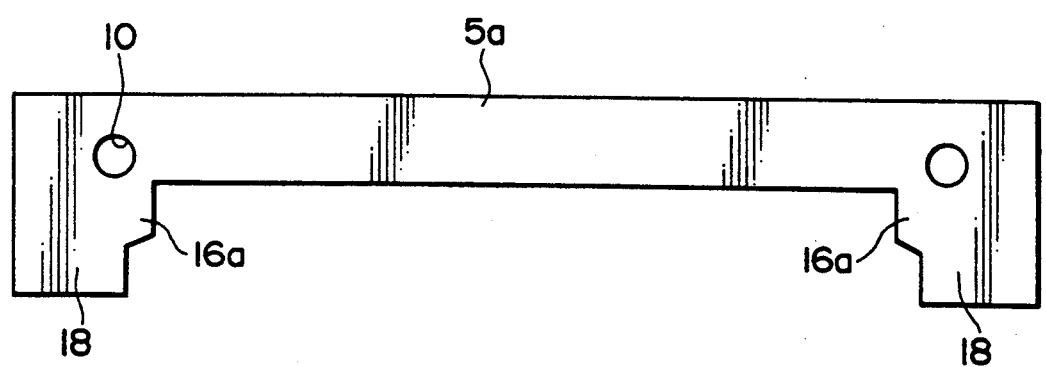
FIG. 17 is a schematic illustration showing in front view a slider end plate associated with and substantially complementary in shape with the rail end plate of FIG. 16 constructed in accordance with another embodiment of the present invention.
Figure 18:
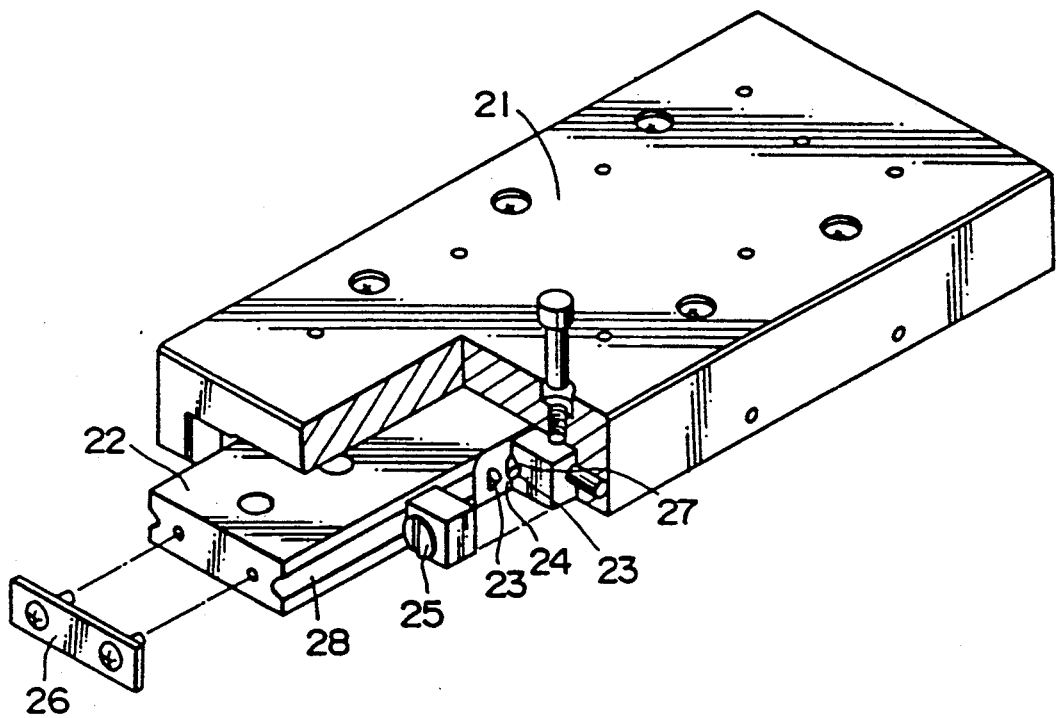
FIG. 18 is a schematic illustration showing in perspective view with parts removed and exploded a typical prior art finite type linear motion guide unit.
Figure 19:
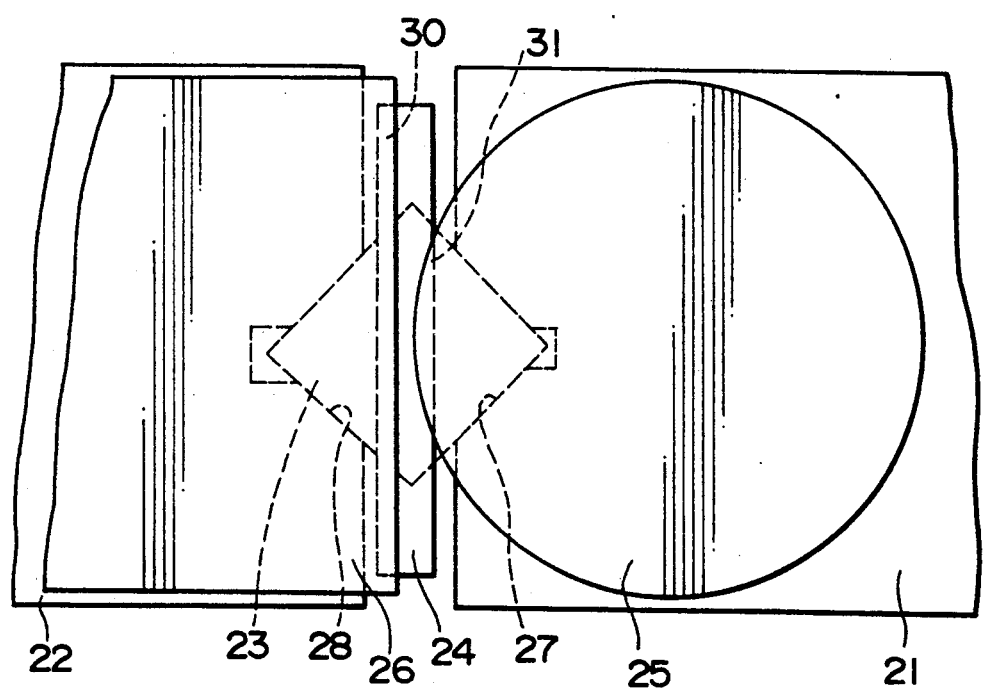
FIG. 19 is a schematic illustration showing on a somewhat enlarged scale the positional relationship among the retainer, end plate and end screw in the prior art guide unit shown in FIG. 18.

FIGS. 16 and 17 illustrate another set of rail and slider end plate 6a and 5a constructed in accordance with another embodiment of the present invention. These end plates 5a and 6a similar in many respects to the end plates 5 and 6 of the previously described embodiment, but the end plates 5a and 6a of the present embodiment differ from those of the previous embodiment as to the location of inward and outward projections. That is, as shown in FIG. 17, in the slider end plate 5a of the present embodiment, in inwardly extending projection 16a is located approximately at the upper half along the inner side of each of its vertical sections 18. The inward projection 16a also includes a slant side edge so as to avoid the creation of stress concentration as described before. In addition, in the rail end plate 6a of the present embodiment as shown in FIG. 16, its outwardly extending projection 17a is provided approximately at the lower half along its side edge. Thus, the inward and outward projections 16a and 17a are substantially complementary in shape with a predetermined gap set therebetween when assembled. Each of these projections 16a and 17a extends substantially across the gap between the opposite side surfaces of the slider 1 and the rail 2, but they terminate short before reaching either the slider 1 or the rail 2, so that these projections 16a and 17a do not come into engagement with each other and also with a corresponding one of the slider 1 or rail 2.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:

a rail extending over a length along a longitudinal axis of said unit and including a first end surface at each end thereof, said rail being provided with first guiding means;

a slider slidably mounted on said rail in a straddling manner and including a second end surface at each end thereof, said slider being provided with second guiding means located opposite to said first guiding means to thereby define a guide channel when assembled;

a plurality of rolling members provided in said guide channel to thereby provide a rolling contact between said rail and said slider; a retainer also provided in said guide channel for retaining said plurality of rolling members in position;

a first end plate having vertical sides, said first end plate being fixedly attached to one end of said slider, said first end plate vertical sides including a first projection projecting laterally from one end portion only of said first end plate vertical sides and which extends inwardly substantially across a gap of said guide channel and terminates short of said rail; and a second end plate having vertical sides, said second end plate being fixedly attached to one end of said rail, said second end plates vertical sides including a second projection projecting laterally from an opposite end portion only of said second end plate vertical sides and which extends outwardly substantially across the gap of said guide channel and terminates short of said slider, said second projection being located so as not to come into engagement with said first projection.

2. The guide unit of claim 1, wherein said first and second projections are substantially complementary in shape at least partly.

3. The guide unit of claim 1, wherein each of said first and second projections has a slant side edge joining an extremity of each projection to the vertical side edge from which each projection projects so as to avoid the creation of stress concentration.

4. The guide unit of claim 1, wherein said rail is generally rectangular in shape and said slider is generally U-shaped in cross section and thus includes a horizontal section and a pair of vertical sections which extend downward from the opposite ends of the horizontal section.

5. The guide unit of claim 4, wherein said first projection is provided approximately at a lower half along an inner side surface of each of the vertical sections of said first end plate and said second projection is provided approximately at an upper half along a side edge of said second end plate.

6. The guide unit of claim 4, wherein said first projection is provided approximately at an upper half along an inner side surface of each of the vertical sections of said first end plate and said second projection is provided approximately at a lower half along a side edge of said second end plate.

7. The guide unit of claim 1, wherein said plurality of rolling members include balls.

8. The guide unit of claim 1, wherein said plurality of rolling members include rollers.

* * * * *